United States Patent [19]

Kamimura et al.

[11] Patent Number: 5,144,559
[45] Date of Patent: Sep. 1, 1992

[54] SYSTEM FOR CONTROLLING ACTIVE SUSPENSIONS OF A VEHICLE

[75] Inventors: Katsuyoshi Kamimura, Tochigi; Atsushi Mine; Yutaka Hiwatashi, both of Gunma, all of Japan

[73] Assignee: Fuji Jukogyo Kabushiki Kaisha, Tokyo, Japan

[21] Appl. No.: 559,748

[22] Filed: Jun. 18, 1990

[30] Foreign Application Priority Data

Jun. 22, 1989 [JP] Japan ................................. 1-160029

[51] Int. Cl.⁵ ............................................. B60G 17/00
[52] U.S. Cl. ............................. 364/424.05; 280/707; 280/840
[58] Field of Search ................... 364/424.05; 280/707, 280/714, DIG. 1, 840

[56] References Cited

U.S. PATENT DOCUMENTS

| | | | |
|---|---|---|---|
| 4,999,777 | 3/1991 | Schussler et al. | 280/707 |
| 5,015,009 | 5/1991 | Ohyama et al. | 280/707 |
| 5,033,770 | 7/1991 | Kamimura et al. | 280/707 |
| 5,042,833 | 8/1991 | Kawabata | 280/707 |
| 5,042,834 | 8/1991 | Yonekawa et al. | 364/424.05 |
| 5,044,661 | 9/1991 | Kawabata | 364/424.05 |
| 5,044,662 | 9/1991 | Kawabata | 280/714 |
| 5,066,041 | 11/1991 | Kindermann et al. | 280/707 |
| 5,080,392 | 1/1992 | Bazergui | 280/707 |

FOREIGN PATENT DOCUMENTS

62-139709  6/1987  Japan .

Primary Examiner—Gary Chin
Attorney, Agent, or Firm—Beveridge, DeGrandi & Weilacher

[57] ABSTRACT

In a system for controlling active suspensions of a motor vehicle, having fluid suspensions for the respective wheels, a lateral acceleration sensor, control valves for the respective suspensions, and a controller for adjusting the control valves to charge and discharge a fluid into and out of the fluid suspensions so as to control the vehicle attitude, a shut-off valve is provided between each control valve and each fluid suspension. The shut-off valve is normally open to enable the control of the vehicle attitude in an active state. When the detected lateral acceleration of the vehicle during a turn exceeds a set reference lateral acceleration, an active-passive changeover circuit delivers a shut-off signal to each shut-off valve thereby to close the shut-off valve, whereby all the fluid suspensions are sealed so that the suspension system becomes a passive state. This enables the elimination of the excessive peformance of the active suspension system and makes the suspension units smaller and less costly, reducing energy consumption.

5 Claims, 4 Drawing Sheets

SYSTEM FOR CONTROLLING ACTIVE SUSPENSIONS OF A VEHICLE

BACKGROUND OF THE INVENTION

The present invention relates to a system for controlling active suspensions of a vehicle.

Active suspension systems of various forms have been developed and publicly disclosed as in Japanese Pat. Appln. Laid-Open Publn. No. 62-139709. A typical example of a known active suspension system comprises the following essential components. Individual suspensions are provided for each wheel for supporting the vehicle by fluid pressure. Charging and discharging of fluid into or out of each suspension is controlled independently by the operation of a respective control valve. Each control valve is controlled by opening and closing control signals generated by a controller responsive to information such as vertical acceleration of the vehicle mass above each suspension unit and vertical displacement of the suspension. The controller calculates command quantity of charging or discharging of the fluid for each suspension unit. Thus the charging and discharging of the fluid into or out of each suspension is controlled.

Applicant has previously developed an active suspension system described below and has filed a U.S. patent application therefor (U.S. application Ser. No. 410,834 now patent No. 5,033,770). In the active suspension system as described above, sensors are used to detect accelerations in the longitudinal and lateral directions of the vehicle. The above described controller preestimates variations of the vehicle attitude (pitching and rolling) accompanying acceleration, deceleration or turning of the vehicle in response to the information from the sensors. Then, the controller computes the command quantity of the charge and discharge of the fluid for maintaining the vehicle attitude in a desirable state, thus generating and transmitting signals for opening and closing the control valves.

Applicant has also developed another active suspension system and filed a U.S. patent application (U.S. application Ser. No. 425,961 now patent No. 5,029,328). The system has means for controlling the vehicle attitude based on the longitudinal and lateral acceleration of the vehicle, as well as means for arbitrarily selecting and setting a vehicle rolling direction and a rolling degree during turning thereof according to a preference of the driver.

In the active suspension system controlling the vehicle rolling based on the lateral acceleration (lateral G), as described, when the lateral G becomes large, the quantity of lateral load shift occurring with the lateral G becomes large, and the suspension reaction force required for maintaining the rolling angle at zero or at a desired angle also becomes large. For this reason, when the lateral G approaches an upper limit value (approximately 0.9 G for normal passenger cars), the lateral load shift quantity becomes extremely large and it becomes difficult to maintain a desired vehicle attitude and to carry out control for improvement of the drive sensation in that state.

Figure 4:
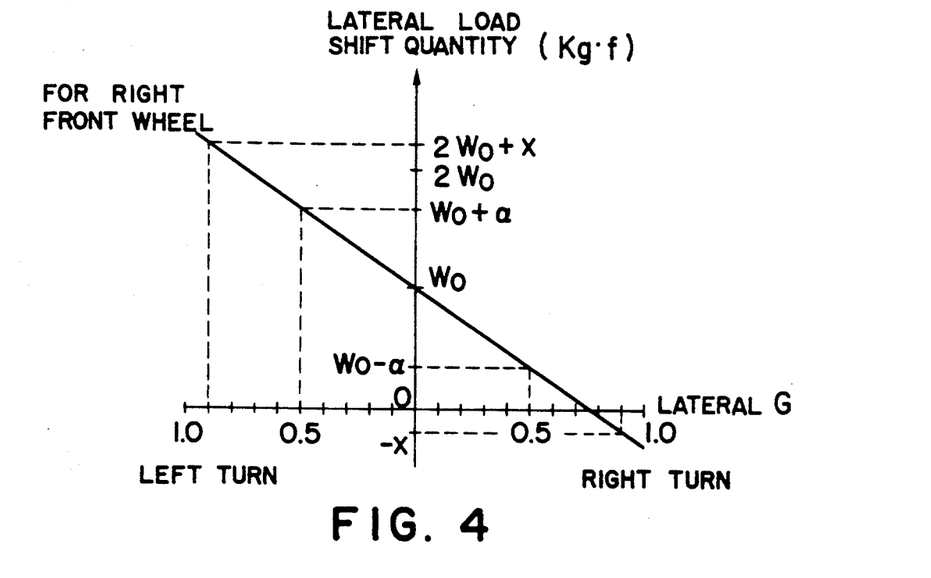
FIG. 4 is a graph showing relationship between the lateral acceleration and the lateral load shift quantity for the right front wheel.
Figure 5:
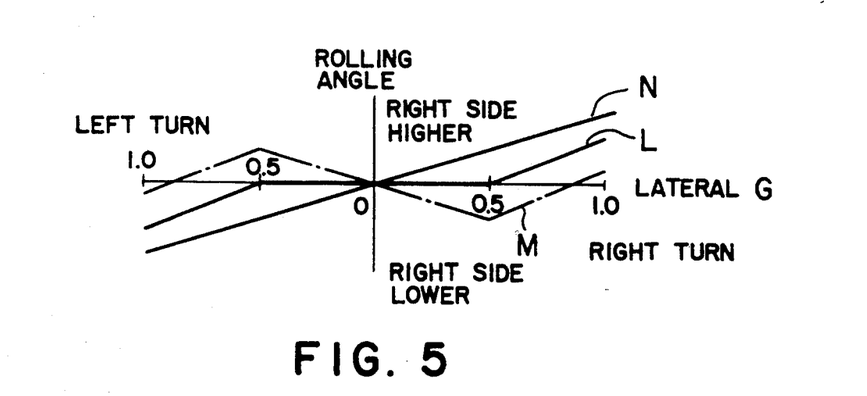
FIG. 5 is a graph indicating the relationship between the lateral acceleration and the rolling angle.

For example, a vehicle will be considered in which a lateral load shift as indicated in FIG. 4 occurs at the right front wheel of the vehicle due to the lateral G. When it is desired to control the rolling of the vehicle within the range of from $(-0.9G)$ to $(+0.9G)$, the control system requires the capability of controlling the suspension reaction force in the range of from $(-x)$ to $(2W_o + X)$kgf (where $W_o$ is an initial suspension reaction force for the right front wheel). In order to produce a suspension reaction force of $(-x)$kgf, a special suspension unit of a double-acting opposite-piston type is required. Furthermore, in order to produce a force of twice the initial suspension reaction force $W_o$, an initial pressure (standard pressure) of the suspension units must not exceed half the internal pressure of a high-pressure pump in the case where a hydro-pneumatic type suspension is used. This means that a high performance is required for the high pressure pump.

SUMMARY OF THE INVENTION

It is an object of the present invention to provide a system for controlling active suspensions of a vehicle, which has a function of controlling the vehicle attitude during a transitional state of turning and which can cope with the problems stated above.

According to the present invention, there is provided a system for controlling active suspensions of a vehicle having fluid suspensions provided for respective wheels, means for charging and discharging a fluid into and out of the respective fluid suspensions to extend and contract the suspensions independently, a lateral G-sensor provided in the vehicle for detecting lateral acceleration of the vehicle, and a controller responsive to an acceleration signal from the G-sensor for adjusting said charging and discharging means so as to control the amount of the fluid to be charged and discharged to maintain the vehicle attitude in a desired state, said system comprising: means for setting a reference lateral acceleration, changeover means for producing a closing signal when the detected lateral acceleration exceeds the reference lateral acceleration, and shut-off means responsive to the closing signal for sealing the fluid in the fluid suspensions to make the fluid suspensions passive.

When the detected lateral acceleration does not exceed the reference lateral acceleration, the suspension system acts as an active suspension accompanying the charging and discharging of the oil into and out of the respective suspension to maintain the vehicle lateral attitude as desired. When the detected lateral acceleration exceeds the reference lateral acceleration, the shut-off valves are closed so that the oil in all the suspensions are sealed so that the system becomes a passive state. Upon further increase of the lateral acceleration, a vehicle rolling occurs which corresponds to the lateral acceleration. Upon decrease of the lateral acceleration, the shut-off valves are opened and the system becomes active again. Thus, the suspension system functions as an active suspension system in normal driving condition. Since the system is not required to operate in the active mode in a condition of large lateral acceleration, the system can be simplified and less costly.

A preferred embodiment of the present invention will become understood from the following detailed description referring to the accompanying drawings.

DESCRIPTION OF THE PREFERRED EMBODIMENT

Figure 1:
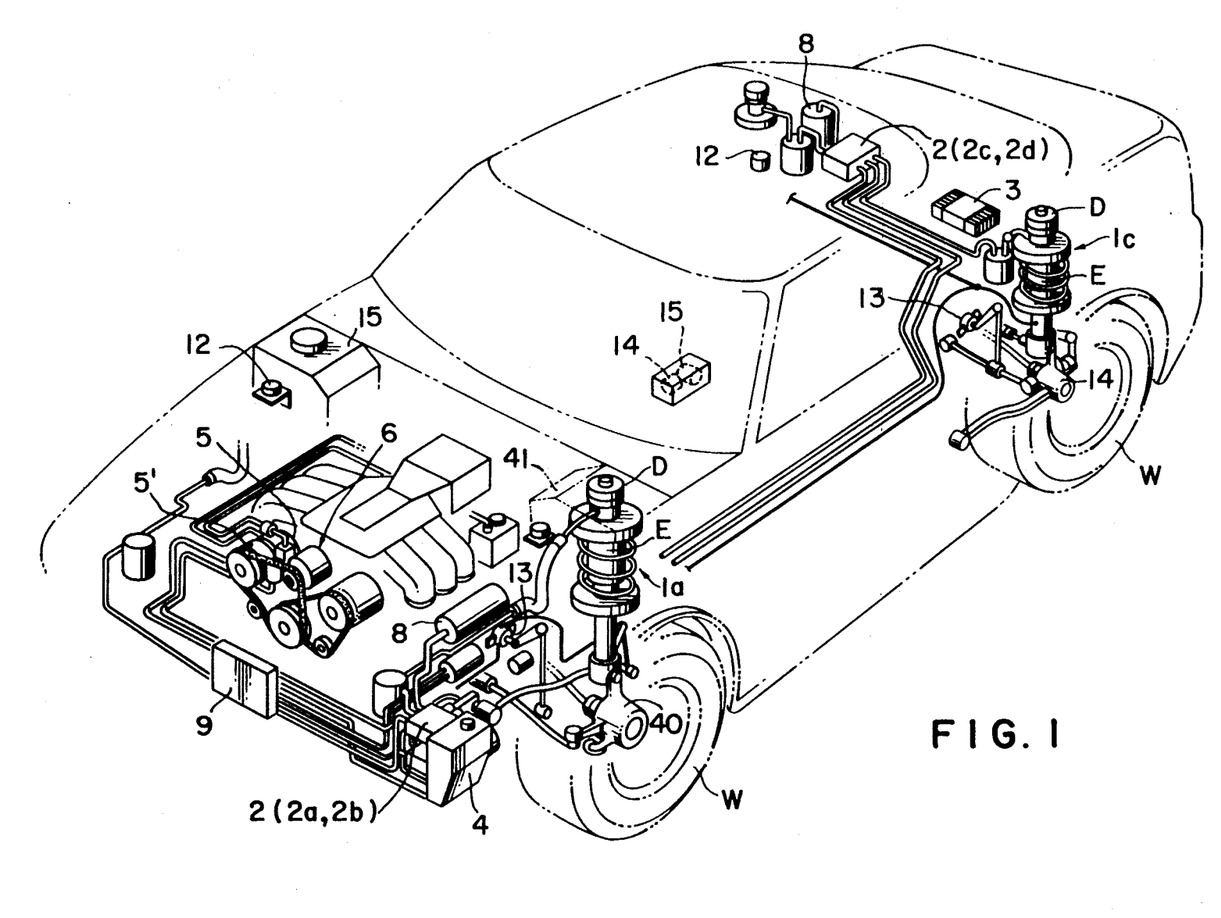
FIG. 1 is a schematic perspective view to a motor vehicle showing a layout of a control system according to the present invention.
Figure 2:
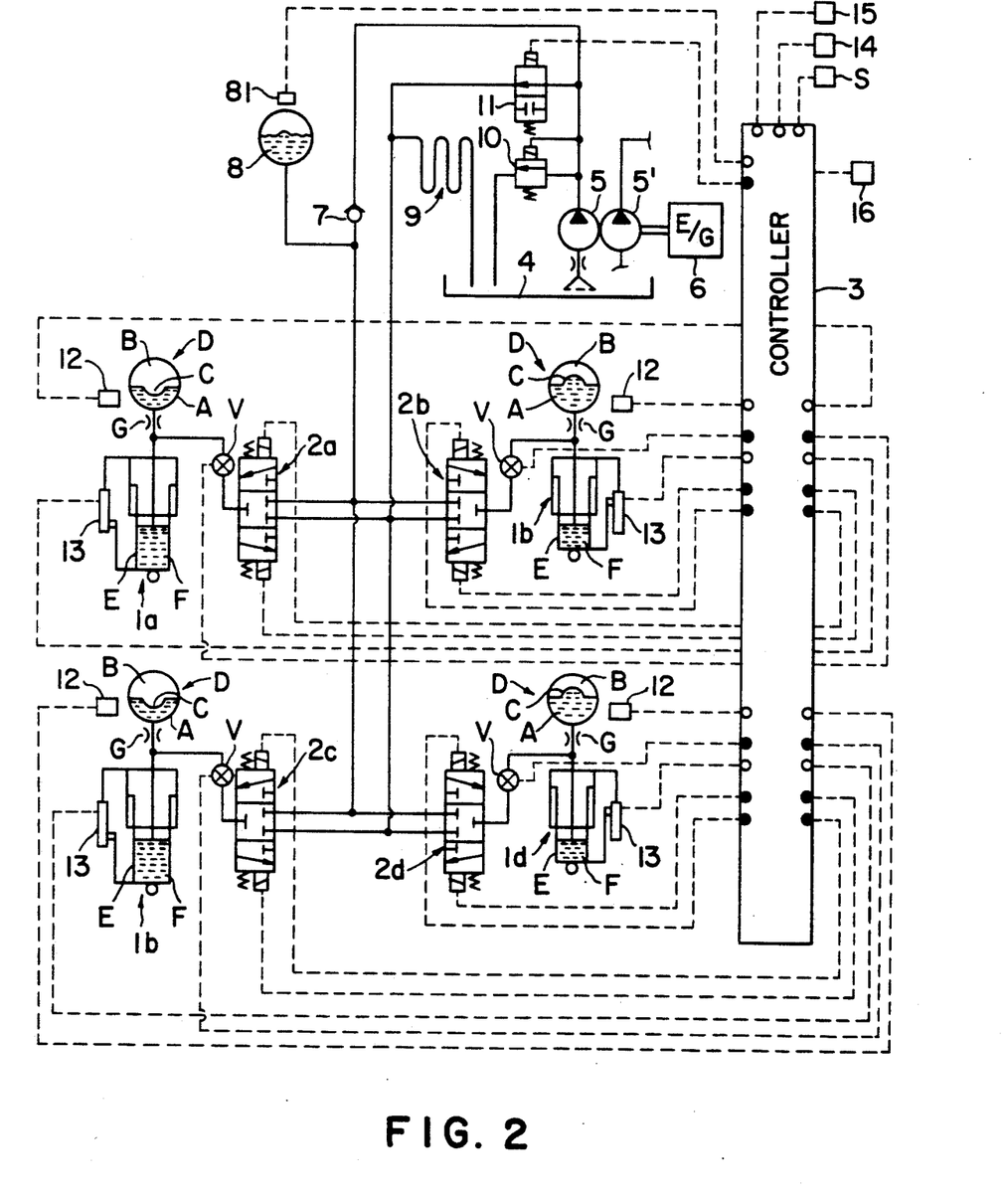
FIG. 2 is, a diagram showing a hydraulic system for suspension units according to the present invention.

FIGS. 1 and 2 show an active suspension system to which the present invention is applied. In FIG. 2, reference characters $1a$ and $1b$ indicate suspensions of left and right front wheels of a motor vehicle, and $1c$ and $1d$ indicate suspensions of left and right rear wheels. Each of the suspensions $1a$, $1b$, $1c$ and $1d$ is provided with a pneumatic spring portion D and a hydraulic cylinder E. The spring portion D has an oil chamber A and an air chamber B which are divided by a diaphragm C. The oil chamber A of the spring portion D communicates with an oil chamber F of the hydraulic cylinder E through an orifice G. As shown in FIG. 1, one end of the hydraulic cylinder E (such as a bottom portion of the cylinder) is connected to a suspension arm member 40 on the vehicle wheel W, and the other end (a piston rod) of the hydraulic cylinder E is connected to a member 41 of a vehicle chassis. In accordance with the load on the cylinder E, hydraulic oil in the oil chamber F flows into and out of the oil chamber A through the orifice G so as to generate an appropriate damping force and at the same time to produce a spring action by the volumetric elasticity of the air sealed in the air chamber B. The system described above is a known hydro-pneumatic suspension system.

There are provided control valves $2a$, $2b$, $2c$ and $2d$ to supply and discharge oil to and from the oil chamber F of the hydraulic cylinders E. The control valves $2a$, $2b$, $2c$ and $2d$ are operated independently by a valve drive signal from a controller 3 to be described later. In FIG. 1, the control valves $2a$, $2b$, $2c$ and $2d$ are installed separately in two groups for the front and rear suspensions.

An oil pump 5 is driven by an engine 6 to pump up oil from an oil reservoir 4 to the system. In the system shown, an oil pump 5' for power steering and the oil pump 5 described above are driven in tandem by the engine 6.

The oil discharged from the oil pump 5 passes through a check valve 7 and is stored in a high-pressure accumulator 8. In FIG. 1, the accumulator 8 is shown to be divided into two sections for the front and rear suspensions. When, the control valves $2a$, $2b$, $2c$ and $2d$ are switched to the charging side, high-pressure oil is supplied to the oil chamber F of the suspensions $1a$, $1b$, $1c$ and $1d$ through the control valves that have been switched to the charging side. When some of the control valves $2a$, $2b$, $2c$ and $2d$ are switched to the discharging side, oil is discharged from the oil chambers F of the suspensions $1a$, $1b$, $1c$ and $1d$ through an oil cooler 9 into the oil reservoir 4.

FIG. 2 shows a relief valve 10 and a valve 11 which is switched to the unload state indicated in the figure, when signals, generated by the controller 3 responsive to signals from a pressure sensor 81, indicate that the high-pressure accumulator 8 has attained a predetermined pressure. When the valve 11 is switched to the unload side, the oil discharged from the oil pump 5 flows to the oil cooler 9 and then into the oil reservoir 4.

The suspensions $1a$, $1b$, $1c$ and $1d$ are provided with suspension stroke sensors 13 as shown in FIGS. 1 and 2. The sensor 13 detects vertical relative displacement for each suspension provided between the wheel and the vehicle body and input the information of the relative displacement for each of the suspensions $1a$, $1b$, $1c$ and $1d$ to the controller 3.

In order to detect behaviors of the vehicle, there are provided a vertical G-sensor 12 to detect vehicle vertical acceleration (vertical G), a lateral G-sensor 15 to detect vehicle lateral acceleration (lateral G) and a longitudinal G sensor 14 to detect vehicle longitudinal acceleration (longitudinal G). FIG. 1 indicates the positions where the G-sensors 12, 14 and 15 are installed are as indicated in FIG. 1. There is further provided a vehicle speed sensor S to detect the speed of the vehicle. Signals of the sensors 12, 13, 14, 15 and S are inputted to the controller 3. Responsive to the input, the controller 3 determines control quantity of charge and discharge of oil for each suspension to send valve drive signals to the respective control valves $2a$, $2b$, $2c$ and $2d$, as will be described below with reference to FIGS. 3 through 6.

There is provided a shut-off valve V between each control valve $2a$, $2b$, $2c$ or $2d$ and each suspension $1a$, $1b$, $1c$ and $1d$. The valve V is normally opened but closed upon receiving a valve-close signal from the controller 3.

Figure 3:
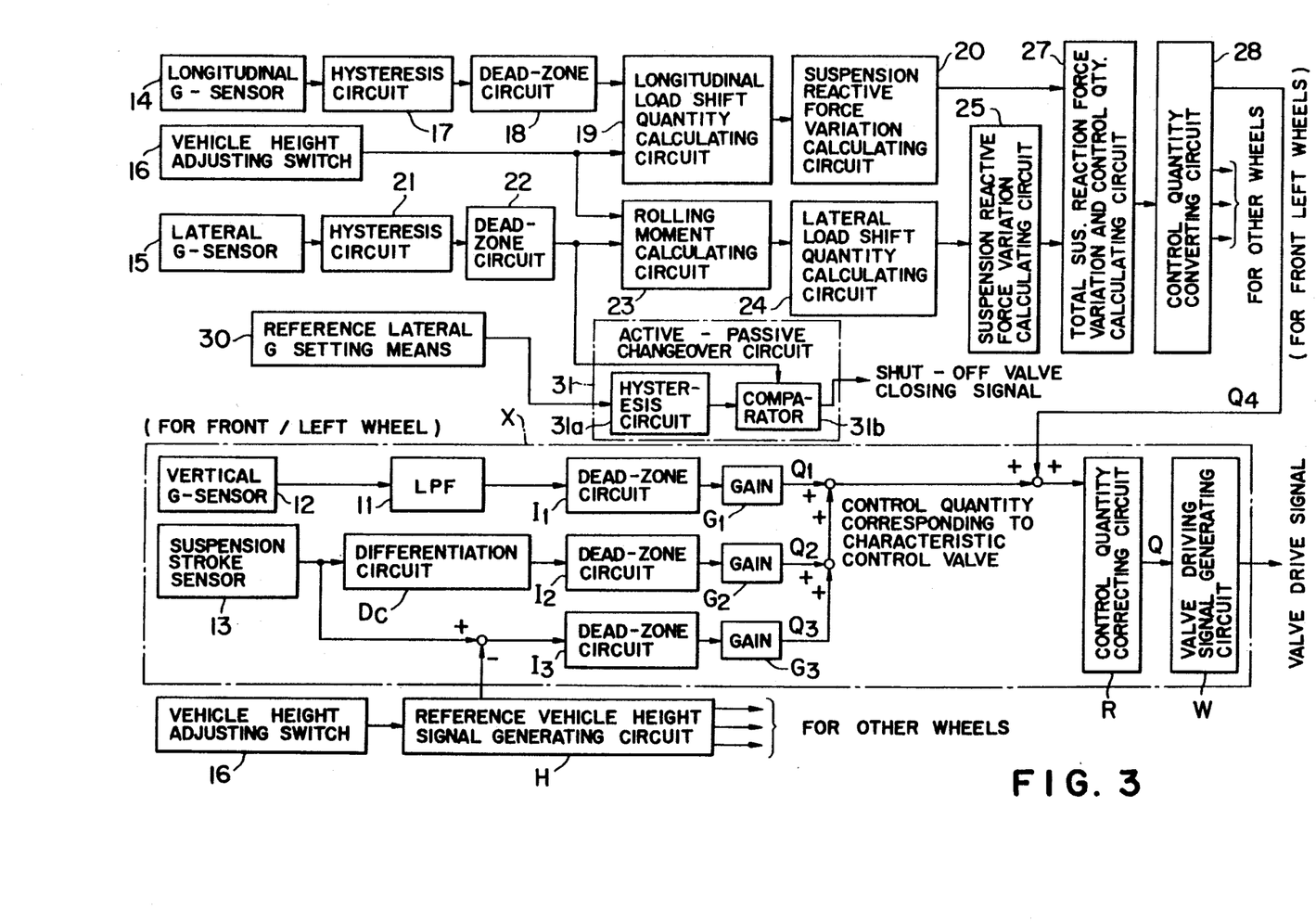
FIG. 3 is a block diagram of the control system according to the present invention.

In FIG. 3, the portion enclosed by a chain line x is a block diagram for the control of one of four suspensions $1a$, $1b$, $1c$ and $1d$, for example, the suspension $1a$ of the left front wheel. While not shown in FIG. 3, a total of four sets of the same control logic are provided for carrying out independent control of the respective suspensions $1a$, $1b$, $1c$ and $1d$.

In each suspension unit, the vertical acceleration and the vertical relative displacement (stroke) are respectively detected by the sensors 12 and 13. The vertical acceleration signal from the vertical G-sensor 12 is passed through a low-pass filter 11 to reduce its high-frequency component. The signal is then passed through a dead-zone circuit $I_1$ to remove a signal of a set range in the neighborhood of zero. The resulting signal is subjected to multiplication by a gain circuit $G_1$. Thus a control command quantity $Q_1$ matched to the characteristics of the corresponding control valve $2a$, $2b$, $2c$ or $2d$ is obtained.

The vertical relative displacement or the stroke signal from the stroke sensor 13 is inputted to a differentiating circuit Dc and a dead-zone circuit $I_3$. The signal passing through the differentiating circuit Dc is converted into a vertical relative displacement or a stroke speed signal. The speed signal passes through a dead-zone circuit $I_2$, which removes therefrom a signal fraction within a set zone in the vicinity of zero. The resulting signal is passed through a gain circuit $G_2$ to become a control command quantity $Q_2$ matched to the corresponding control valve characteristics.

By setting a vehicle height adjusting switch 16, a reference vehicle height signal is generated from a reference vehicle height generating circuit H. The reference vehicle height signal is subtracted from the vertical relative displacement signal to be inputted to the dead-zone circuit $I_3$, and an actual relative displacement signal is obtained. The actual relative displacement signal is passed through the dead-zone circuit $I_3$, where a signal fraction within a set zone in the vicinity of zero is removed therefrom. The resulting signal is passed through a gain circuit $G_3$ to become a control command quantity $Q_3$ matched to the corresponding control valve characteristic.

The control command quantity ($Q_1$, $Q_2$, and $Q_3$) matched to the characteristics of the corresponding control valve is as follows. In the case where the control valve is, for example, a flow rate control valve, the control command quantity is the length of opening time of the valve, necessary to obtain a required quantity of hydraulic oil to be charged or discharged. The length of the valve opening time is determined with consideration of the valve opening-closing characteristics.

The three control command quantities $Q_1$, $Q_2$, and $Q_3$ are added as shown. The resulting sum of the quantities is passed through a control quantity correcting circuit R to be converted into a corrected command quantity Q corrected with consideration of environmental conditions such as temperature and pressure loss due to length of piping. The corrected quantity Q is passed through a valve driving signal generating circuit W, which thereupon generates a control valve opening/closing signal. Thus, the control valve $2a$ is switched to the oil charging side or the discharging side. As a result, charging or discharging of oil of the command quantity into or out of the suspension $1a$ is accomplished.

In the control operation described above, when vertical acceleration is detected, oil within the suspension $1a$, for example, is discharged responsive to upward acceleration. For downward acceleration, oil is charged into the suspension $1a$. By such control operation, with respect to forces from below such as a bump or thrust from the road surface, soft and high attenuation suspension characteristics are created. With respect to forces from above (i.e., from the vehicle body), hard suspension characteristics are created so as to maintain the vehicle height at the reference vehicle height due to the control responsive to the vertical stroke speed and the vertical stroke, by controlling the charge and discharge of the oil.

Furthermore, by passing the vertical acceleration signal through the low-pass filter 11, the control system does not react to vibrations in the high-frequency region as in resonance of the mass below the suspensions, but responds to vibrations of low-frequency region as in resonance of the mass above the suspensions. Accordingly, the control system can avoid bouncing so as to improve the drive ability, thus preventing waste of energy for the control.

The vehicle height adjusting switch 16 is a changeover switch for changing the height from a normal position to a high position. When the normal vehicle height is selected, the reference vehicle height signal generating circuit H generates a low reference vehicle height signal. When the vehicle height adjusting switch 16 is changed over to the side of the high vehicle height, the reference vehicle height signal generating circuit H generates a high reference vehicle height signal.

The control responsive to the vertical stroke signal from the sensor 13 functions to maintain the vehicle height at the reference vehicle height. Therefore, when the reference vehicle height is switched from the normal reference vehicle height to the high reference vehicle height, the control command quantity $Q_3$ is generated for charging the oil. Thus oil is charged into the suspension $1a$, for example, thereby to raise the vehicle height to a height equal to the high reference vehicle height. When the vehicle height adjusting switch 16 is returned to the side of the normal vehicle height, the control command quantity $Q_3$ is generated for discharging oil. Thus, the oil within the suspension $1a$ is discharged. As a consequence, the vehicle is lowered to the normal reference vehicle height. The discharging and charging of oil are simultaneously carried out for all the suspensions by the switching operation of the wheel height adjusting switch 16.

In addition to the control in the state of normal driving state, control is necessary also when a large acceleration is suddenly applied in the longitudinal direction or the lateral direction of the vehicle at a sudden braking, abrupt acceleration, or sudden turning. In such a case, prompt and positive control of the vehicle attitude without delay is required. For this purpose, there is provided a control logic based on the detection signals of the longitudinal G-sensor 14 and the lateral G-sensor 15.

More specifically, as shown in FIG. 3, the longitudinal acceleration signal detected by the longitudinal G-sensor 14 is passed through, and converted by a hysteresis circuit 17 and a dead-zone circuit 18. By the hysteresis and dead-zone circuits 17 and 18, the longitudinal acceleration signal is converted to attain a control which does not respond to longitudinal G fluctuations of an ordinary order during normal driving but responds to large pitching of the vehicle body at a full acceleration or of braking with greater degree than medium. The signal thus converted is then introduced into a circuit 19 for calculating longitudinal load shift quantity.

The calculating circuit 19 operates to calculate the load shift quantity in the longitudinal direction, responsive to the input signal fed thereinto, previously stored vehicle specification, and information on the present height of the vehicle center of gravity above the ground determined from the vehicle height adjusting switch 16.

The calculation result is transmitted to a circuit 20 for calculating variation of suspension reaction force. The calculating circuit 20 operates to calculate the variation of the suspension reaction force, which may arise from the load shift quantity at each position of the suspension, with consideration of driving force and braking force acting on the tires, responsive to the information thus fed thereinto and other information such as the type of the suspensions and the driving type (front-wheel drive, rear-wheel drive, four-wheel drive, etc.).

Consideration of the driving force and the braking force acting on the tires depending upon the type of the suspensions and the driving type, has the following significance. In the case of a trailing-arm type suspension, when a braking force acts on the wheel, the reaction force is received and held by a bearing of the trailing arm. For this reason, in general, a moment in the direction for compressing the suspension is applied to the trailing arm (antilift geometric characteristic at the time of braking). Accordingly, the reaction force to the front wheel increases and the reaction force to the rear wheel decreases with respect to longitudinal load shifting quantity which arises due to inertial force. As a suspension reaction force at the time of acceleration, a moment is applied in the direction for stretching the suspension spring due to the driving reaction force to a driving wheel. Such a moment does not occur in a driven wheel.

As described above, the variation of the suspension reaction force differs depending upon factors such as the position of the trailing arm and the position of the rocking or pivoting axis thereof. In the case of a suspension of the wishbone type, the variation of the suspension reaction force differs depending upon the inclinations of the rocking axes of upper and lower control arms. In the case of a MacPherson type suspension, the variation differs depending upon factors such as the inclination of the suspension strut and the position of the rotational axis of a lower arm.

Therefore, the variation of the reaction force is calculated accurately on the basis of the type of suspension and the type of driving.

Similarly, as in the case of the longitudinal G-sensor 14, the lateral acceleration detected by the lateral G-sensor 15 is also passed through a hysteresis circuit 21 and a dead-zone circuit 22. Thus, the control avoids response to minute lateral G-fluctuations occurring during normal driving. In this manner, only a signal above a predetermined value is inputted to a circuit 23 for calculating the rolling moment. From the input signal, the calculating circuit 23 calculates the rolling moment on the basis of the vehicle specification previously stored and information of the height of the vehicle body center of gravity determined by the vehicle height adjusting switch 16. The calculation result is transmitted to a circuit 24 for calculating a lateral load shift quantity.

Separately, a vehicle speed signal generated by a vehicle speed sensor S is transmitted to a circuit 25 for setting rolling moment front-rear distribution ratio. From the vehicle speed information thus received, the circuit 25 determines the rolling moment front-rear distribution ratio, on the basis of a characteristic of a previously set vehicle speed - rolling moment front-rear distribution ratio. The determined rolling moment front-rear distribution ratio is transmitted to the calculating circuit 24.

The calculating circuit 24 operates to distribute the generated rolling moment inputted from the rolling moment calculating circuit 23 to the front and rear wheels and calculates the lateral shift load quantity between the lateral loads of the front and rear wheels on the basis of the rolling moment front-rear distribution ratio determined by the distribution ratio setting circuit.

The resulting output of the calculating circuit 24 is fed to a circuit 25 for calculating the variation of the suspension reaction force. In the calculating circuit 25, the total lateral force acting on the wheels corresponding to the generated lateral G is distributed to the front and rear wheels based on the yaw moment equilibrium equation with the position of the vehicle center of gravity and the distance between the front and rear axles. Then, with consideration of the lateral load shift quantity between the front and rear wheels calculated by the calculating circuit 24, the lateral forces on the front and rear wheels, the vehicle height, and the type of the suspensions, the variation of the suspension reaction force is calculated separately for each of the front and rear suspensions.

The variations of the suspension reaction forces calculated respectively by the calculating circuits 20 and 25 are added in a circuit 27 for calculating the total variation of the suspension reaction force. And the circuit 27 further calculates the control quantity of charge and discharge of the oil matching the total variation of the suspension reaction force for maintaining the internal pressure of each suspension. The resulting control quantity is converted into a control command quantity matching the valve specification or characteristic in a circuit 28 for converting control quantity. The converted control command quantity $Q_4$ is added to the control command quantities $Q_1$, $Q_2$, and $Q_3$ The resulting quantity is fed into a circuit R for correcting the control quantity.

As described above, there is provided a control system for controlling the charge and discharge of oil for each suspension independently in response to vertical acceleration of the mass above the suspension and the vertical relative displacement between the masses above and below the suspensions, so as to improve the driveability. Moreover, the above control system controls the vehicle attitude responsive to the longitudinal G and the lateral G of the vehicle. By the arrangement described above, under driving conditions such as the acceleration and the turning, vehicle body attitude is controlled without responsive delay by the control logic based on the longitudinal G and the lateral G, with respect to, transitionally, the pitching and rolling of the vehicle body.

In the active suspension control system described above, if the lateral G becomes large and approaches an upper limit value as indicated in FIG. 4, which is a graph showing a relationship between the lateral G and the lateral load shift quantity for the front right wheel, the lateral load shift quantity becomes extremely large and it becomes difficult to control the vehicle attitude. This means that the control of the drive feeling also becomes difficult.

In order to overcome this problem, the system according to the present invention uses the shut-off valve V for each of the suspensions 1a, 1b, 1c and 1d, as shown in FIG. 2. The shut-off valve V is installed in the oil passage between each control valve 2a, 2b, 2c and 2d and each suspension 1a, 1b, 1c and 1d. The shut-off valve V for each suspension is closed upon receiving a signal from the controller 3.

The shut-off valve V is operated by a control device described below. As shown in FIG. 3, the system has means 30 for setting a reference lateral G which is of a value determined in relation to the upper limit value of the lateral G mentioned before. There is further provided an active-passive changeover circuit 31, which receives the signal from the lateral G-sensor 15 through the hysteresis circuit 21 and the dead-zone circuit 22. The lateral G signal inputted to the changeover circuit 31 is compared with the signal from the reference lateral G setting means 30 at a comparator 31b. When the lateral G signal exceeds the reference lateral G, the changeover circuit 31 delivers a closing signal to the shut-off valve V. When the closing signal is delivered to the valve V, the valve V is closed to shut off the communication between each control valve 2a, 2b, 2c or 2d and each suspension 1a, 1b, 1c and 1d. This means that the active suspension system becomes a passive suspension system wherein the oil in the suspensions is sealed without charging and discharging thereof.

The reference lateral G is set to be approximately a half the upper limit value. For example, for ordinary cars of which the upper limit value of the lateral G is approximately 0.9G, the reference lateral G is set at approximately 0.5G. By setting the reference lateral G as above, the control range $(W_o - \alpha) - (Whd\ o + \alpha)$ of the suspension reaction force for each suspension becomes larger than zero and smaller than twice the initial suspension reaction force $W_o$. An ordinary active suspension system can be modified to carry out the above control without increasing the cost and ability of the high pressure pump.

Figure 6:
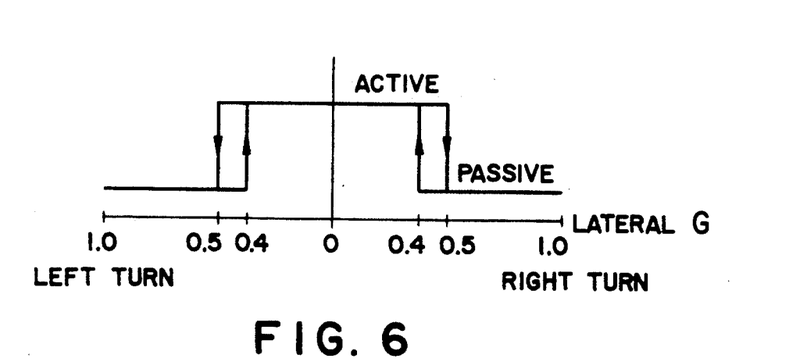
FIG. 6 is a graph explaining a hysteresis accompanying the changeover between "active" and "passive" states.

The changeover circuit 31 includes a hysteresis circuit 31a to apply a hysteresis to the reference lateral G, as indicated in FIG. 6. In the example shown in FIG. 6, the reference lateral G to cause changeover from "active" to "passive" is set at 0.5g and the reference lateral G to cause changeover from "passive" to "active" is set at 0.4g. The changeover with hysteresis between "active" and "passive" prevents chattering during the opening and closing of the changeover valve V.

The system functions to maintain the rolling angle of the vehicle body at zero responsive to the detected lateral G. With the shut-off valve V and the active-passive changeover circuit 31, the system functions, as indicated by L in FIG. 5, in such a manner that when the lateral G during a turning is below the reference lateral G, for example 0.5g, the shut-off valve is maintained open and the suspensions are independently controlled by charging and discharging of the oil to maintain the vehicle attitude horizontal due to the transitional state control responsive to the detected lateral G and due to the feedback control responsive to the detected suspension strokes. The system also functions in such a manner that when the lateral G exceeds the reference lateral G, the changeover circuit 31 delivers the valve closing signal to close all the shut-off valves V. When the valve V is closed, the oil in each suspension is hermetically confined or sealed and the suspension becomes a passive state, so that vehicle body rolling begins with further increase of the lateral G. However, since the rolling had been maintained to be zero until the lateral G exceeded the reference lateral G, the rolling angle of the vehicle body is maintained smaller than the rolling angle N (FIG. 5) in the conventional motor vehicle without the control of the rolling angle.

U.S Pat. application No. 425,961 referred to previously discloses an active suspension system which is provided with a rolling direction selecting switch for selecting the rolling direction and the rolling degree during vehicle turning and a control system responsive to the detected lateral G and the variation of the suspension stroke for maintaining the rolling degree as selected by the selecting switch.

When the shut-off valve V and the active-passive changeover circuit 31 are provided in the active suspension system of the prior art, the following operation is obtained. That is, when the lateral G does not exceed a set reference lateral G (for example, 0.5 G), the control is carried out in an active state to maintain a vehicle rolling as selected by the selecting switch. When the lateral G exceeds the set reference lateral G, the shut-off valves V are all closed and the suspensions become a passive state. The system then gives a rolling characteristic as indicated by M in FIG. 5 in the case where a reverse rolling is selected by the selecting switch.

By changing over the suspension system from "active" control to "passive" control upon the lateral G exceeding the set reference value as stated above, the system sufficiently maintains the function of an active suspension with good drive feeling and vehicle body attitude control in the range of normal lateral G. It is further possible for the system to readily obtain a vehicle characteristic of softer drive feeling than conventional vehicles and of small rolling angle during the turning with large lateral G.

It is to be noted that the present invention is not limited to the embodiment described before but is applicable to any active suspension system of the following description for a vehicle. Such an active suspension system has suspensions supporting the vehicle body by fluid pressure. Means are provided for detecting at least variations in the vertical displacement of the suspensions. The active suspension system also carries out charge and discharge of the fluid into and out of each suspension independently so as to maintain the vehicle attitude in desired state in accordance with the variations in the vertical displacement of the suspensions. The system further has at least a lateral G-sensor, the charge and discharge of the fluid are made so as to carry out vehicle rolling control.

As described above, the present invention eliminates the excessive performance of active suspension system units especially a high pressure pump, making the units smaller and less costly and saving the control energy and fuel. Furthermore, the present invention provides a vehicle characteristic of softer suspension of good feel and of smaller rolling angle than in conventional vehicle during a turn with a large lateral acceleration.

While the presently preferred embodiment of the present invention has been shown and described, it is to be understood that the disclosure is for the purpose of illustration and that various changes and modifications may be made without departing from the scope of the invention as set forth in the appended claims.

What is claimed is:

1. A system for controlling active suspensions of a vehicle, having fluid suspensions provided for respective wheels, means for charging and discharging a fluid into and out of the respective fluid suspensions to extend and contract the suspensions independently, a lateral Gsensor provided in the vehicle for detecting lateral acceleration of the vehicle, and a controller responsive to an acceleration signal from the G-sensor for adjusting said charging and discharging means so as to control the amount of the fluid to be charged and discharged to maintain the vehicle attitude in a desired state, said system comprising:
means for setting a reference lateral acceleration;
changeover means for producing a closing signal when the detected lateral acceleration exceeds the reference lateral acceleration; and
shut-off means responsive to the closing signal for sealing the fluid in the fluid suspensions to change the fluid suspensions from an active state to a passive state.

2. The system according to claim 1, wherein
said shut-off means are shut-off valves installed in passages connecting said charging and discharging means to said fluid suspensions, respectively, to take a normal open position and a closed position.

3. The system according to claim 1, wherein
said changeover means includes a hysteresis circuit provided to change a value of the reference lateral acceleration with a hysteresis when a shut-off valve in said shut-off mans is returned to the normal position.

4. The system according to claim 1, further comprising hysteresis means for hysteresis-processing the detected lateral acceleration.

5. The system according to claim 4, further comprising dead-zone means for processing the hysteresis-processed lateral acceleration with a dead-zone.

* * * * *

UNITED STATES PATENT AND TRADEMARK OFFICE
CERTIFICATE OF CORRECTION

PATENT NO. : 5,144,559

DATED : Sept. 1, 1992

INVENTOR(S) : Katsuyoshi Kamimura et al.

It is certified that error appears in the above-identified patent and that said Letters Patent is hereby corrected as shown below:

On the title page, item:

"[21] Appl. No. 559,748"

should be corrected to read:

--[21] Appl. No. 539,748--.

Signed and Sealed this

Twenty-eighth Day of September, 1993

Attest:

BRUCE LEHMAN

Attesting Officer     Commissioner of Patents and Trademarks